INVENTOR:
Patrik Samuel Rydbeck

UNITED STATES PATENT OFFICE.

PATRIK SAMUEL RYDBECK, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

APPARATUS FOR MANUFACTURING RINGS, ESPECIALLY TRACK-RINGS FOR BALL AND ROLLER BEARINGS.

1,354,779.  Specification of Letters Patent.  Patented Oct. 5, 1920.

Application filed July 9, 1918. Serial No. 244,060.

*To all whom it may concern:*

Be it known that I, PATRIK SAMUEL RYDBECK, a subject of the King of Sweden, residing at Gottenborg, in the Kingdom of Sweden, have invented new and useful Apparatus for Manufacturing Rings, Especially Track-Rings for Ball and Roller Bearings, of which the following is a specification.

This invention relates to means for manufacturing rings especially track rings for ball and roller bearings.

The primary object of the invention is to provide an improved pressing apparatus by means of which such rings may be manufactured with exact dimensions simpler and cheaper than heretofore.

The invention consists, chiefly, in the combination with a pressing apparatus, of a die having inside the shape of the outer side of the ready pressed ring, a counter-die adapted to support one end of a tubular blank, an upsetting ring movable longitudinally in relation to the die and adapted to press against the other end of the blank and a mandrel movable longitudinally in the upsetting ring and having the shape of the inner side of the ready pressed ring.

An embodiment of my invention is illustrated in the accompanying drawings in which—

Figure 1:
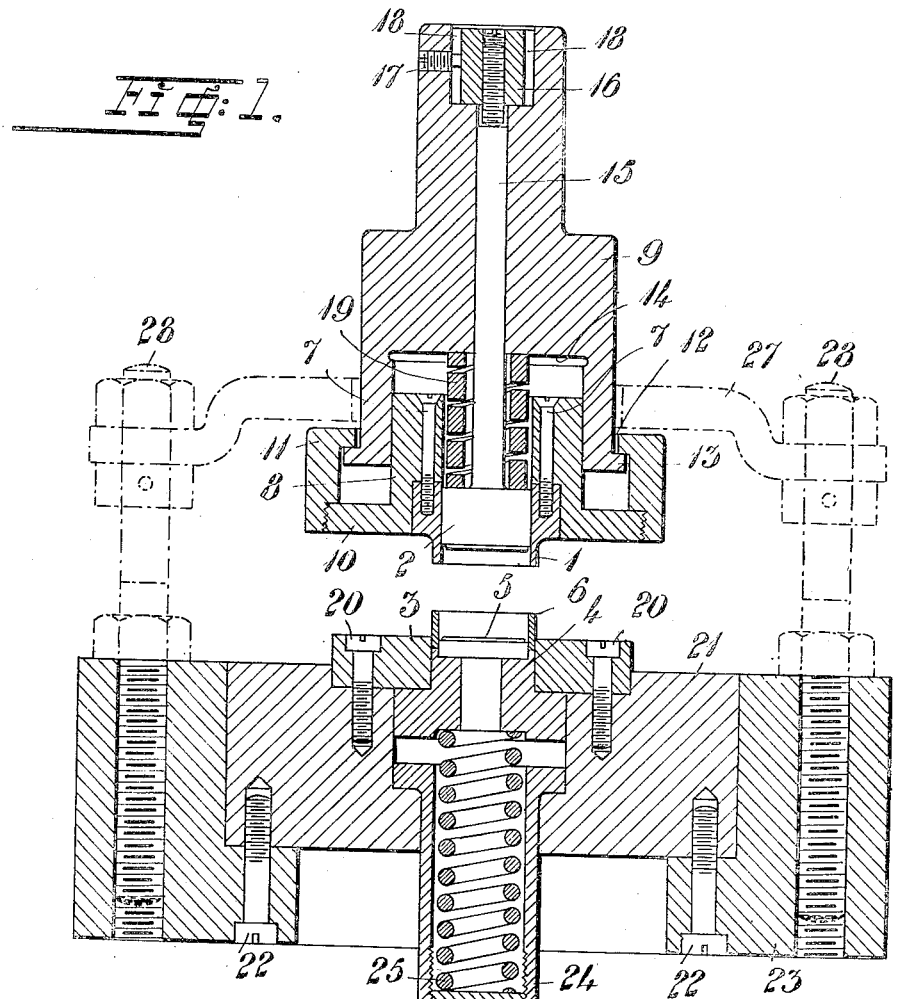
Figure 2:
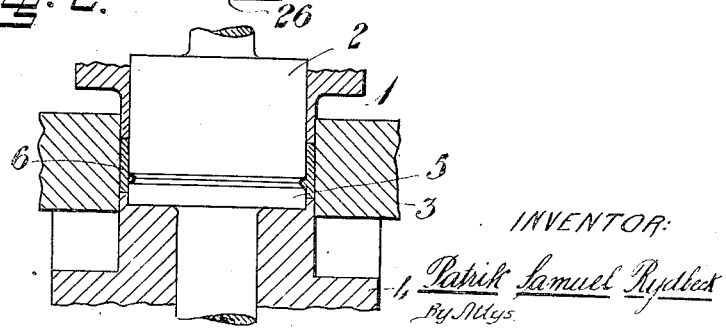

Figure 1 is a vertical section of an upsetting device constructed according to this invention, and Fig. 2 is a sectional view, on a greater scale, of the pressing tools and the ready pressed ring.

Referring to Figs. 1 and 2, showing a device adapted for pressing the outer track-rings of ball bearings, said device consists, chiefly, of an upsetting ring 1, a cylindrical mandrel 2 movable in relation to said ring, a die 3 and a counter-die 4 movable relatively to the die 3 within certain limits and provided with a cylindrical mandrel 5 having a diameter equal to that of the mandrel 2. The mandrels 2 and 5 are turned off at the ends facing each other, so that, when said ends contact each other, an annular recess is formed corresponding to the shoulder of the finished track-ring 6, as will appear from Fig. 2.

The upsetting ring 1 is, by means of screws 7, fastened to a socket 8 movable in the longitudinal direction in a holder 9 connected with the movable members of the pressing machine. At the lower end the socket 8 is provided with an annular flange 10 onto which is screwed an outer socket 11 provided at the top with an inwardly directed flange 12. In the position shown in Fig. 1 the flange 12 bears against a flange 13 disposed at the lower end of the holder 9 thus preventing the socket 8 and the upsetting ring 1 from falling down. The upward movement of the socket 8 is limited by the bottom 14 of the holder 9. Placed inside the socket 8 and movable longitudinally in relation to the same is the mandrel 2, the turned off portion 15 of which is guided in a central hole in the holder 9 and provided at its upper threaded end with a nut 16 placed in a bore in the upper end of the holder 9, said nut limiting the downward movement of the mandrel 2. The nut 16 is prevented from turning by means of a screw 17 screwed in the holder 9 and engaging one of the notches 18 in the nut. Placed between the mandrel 2 and the bottom 14 of the holder 9 is a strong spring 19 counteracting the upward movement of the mandrel 2 and the travel of which is equal to or greater than the upsetting of the ring 6. The mandrel 2, which fits snugly in the upsetting ring 1, has a diameter corresponding to the inner diameter of the finished ring 6, and the outer diameter of the lower portion of the upsetting ring 1 is equal to the outer diameter of the ring 6 and the inner diameter of the cylindrical bore of the die 3.

The die 3 is, by means of screws 20, fixed to a die-holder 21 secured by means of screws 22 to an annular support 23 adapted to be placed on the stationary table of the up-setting machine. The counter-die 4, provided, as mentioned above, with a mandrel 5 corresponding to the mandrel 2, is guided, on the one hand, by the die 3 and, on the other hand, by the die-holder 21, the latter being provided, to this purpose, with a cylindrical bore concentric with the bore of the die 3. Placed in the bore of the die-holder 21 is a socket 24, the top of which serves as a stop for the counter-die 4 on its downward motion. This motion is counteracted by a spiral-spring 25 placed in the socket 24 and bearing, on the one hand, against the lower side of the counter-die 4 and, on the other hand, against the removable bottom 26 of the socket 24. The counter-die 4 is normally kept, by the action of the spring 25, in the position shown in Fig. 1, so that its lower portion bears against the lower side of the die 3.

Further a stripper 27 is provided consisting of an annular member inclosing the holder 9 and provided with two radial arms rigidly secured by means of screw-bolts 28 to the support 23.

The operation of the device described is as follows: The tubular blank 6 is placed on the counter-die 4 in the annular space between the die 3 and the mandrel 5. Then the holder 9 together with the socket 8 and the upsetting ring 1 is moved downward, so that the upsetting ring 1 bears against the top of the blank 6. Since the pressure exerted by the upsetting ring corresponds only to the weight of the sockets 8 and 11 and the upsetting ring, and because said pressure is less than the counter-pressure exerted by the spring 25, the downward movement of the upsetting ring is checked for a moment, while the holder 9 and the mandrel 2 continue to move downward, so that the said mandrel is pushed into the blank 6. Then the mandrel 2 strikes the mandrel 5, and on account thereof the latter together with the counter-die 4 is moved downward against the action of spring 25, until the lower side of the counter-die strikes the top of the stationary socket 24. Meanwhile the bottom 14 of the holder 9 is brought in contact with the top of the socket 8, so that the latter together with the upsetting ring 1 is carried along by the holder 9 in its downward motion, blank 6 thereby being moved down into the die 3 in contact with the arrested counter-die 4. Then the upsetting of the blank 6 commences, since the holder 9 together with the socket 8 and the upsetting ring 1 may be moved farther down a distance corresponding to the travel of spring 19. The tension of this spring must be so great that the pressure caused by the material of the blank being pressed into the annular recess between the mandrels, be not capable of moving the mandrels apart. Thus the tubular piece 6 assumes the sectional form shown in Fig. 2.

At the next upward motion of the holder 9 and the mandrel 2, the counter-die 4 and the mandrel 5 and at the same time the ring 6 and the upsettting ring 1 together with the socket 8 are moved upward owing to the action of the spring 25. The finished ring 6 adheres still to the mandrel 2. At the continued upward motion of the holder 9 the socket 11 strikes the stripper 27, and on account thereof the socket 8 and the upsetting ring 1 are moved downward to the position shown in Fig. 1; the ring 6 thus being stripped off from the mandrel 2 may be removed in any suitable manner.

As will appear from Fig. 2, the finished track-ring 6 has one shoulder only.

It is not to be understood from the particularity with which the construction herein set forth is described, that the invention is to be limited to all the features herein set forth, as it is capable of variations or modifications in construction within the scope of the appended claims.

Having now particularly described and ascertained the nature of my said invention and in what manner the same is to be performed, I declare that what I claim is:—

1. Apparatus for producing rings, as for instance track rings for ball and roller bearings, comprising a die having inside the shape of the outer side of the finished ring, a counter-die adapted to support one end of a tubular blank, an upsetting ring movable longitudinally in relation to the die and adapted to press against the other end of the blank, a mandrel movable longitudinally in the upsetting ring and having the shape of the inner side of the finished ring, and a spring backing said mandrel and adapted to support it against the upsetting pressure.

2. Apparatus for producing rings, as for instance track-rings for ball and roller bearings, comprising a die having inside the shape of the outer side of the finished ring, a counter-die adapted to support one end of a tubular blank, an upsetting ring movable longitudinally in relation to the die and adapted to press against the other end of the blank, a mandrel movable longitudinally in the upsetting ring and having the shape of the inner side of the finished ring, and another mandrel provided in the counter-die and placed coaxially with the first-named mandrel.

3. Apparatus for producing rings, as for instance track-rings for ball and roller bearings, comprising a die having inside the shape of the outer side of the finished ring, a counter-die adapted to support one end of a tubular blank, an upsetting ring movable longitudinally in relation to the die and adapted to press against the other end of the blank, a mandrel movable longitudinally in the upsetting ring and having the shape of the inner side of the finished ring, and another mandrel provided in the counter-die and placed coaxially with the first-named mandrel, each mandrel having the end facing the other mandrel reduced and so formed that the ends, when in contact, correspond to an inner shoulder of the finished ring.

4. Apparatus for producing rings, as for instance track-rings for ball and roller bearings, comprising a die having inside the shape of the outer side of the finished ring, a counter-die adapted to support one end of a tubular blank and movable to a certain extent in relation to said die, a spring supporting said counter-die, and adapted to yield to said movement, an upsetting ring movable longitudinally in relation to the die and adapted to press against the other end of the blank, and a mandrel movable longitudinally in the upsetting ring and having the shape of the inner side of the finished ring.

5. Apparatus for producing rings, as for instance track-rings for ball and roller bearings, comprising a die having inside the shape of the outer side of the finished ring, a counter-die adapted to support one end of a tubular blank, an upsetting ring movable longitudinally in relation to the die and adapted to press against the other end of the blank, a mandrel movable longitudinally in the upsetting ring and having the shape of the inner side of the finished ring, another mandrel provided in the counter-die and placed coaxially with the first-named mandrel, and a spring counteracting the motion of the first-named mandrel.

6. Apparatus for producing rings, as for instance track-rings for ball and roller bearings, comprising a cylindrical die having inside the shape of the outer side of the finished ring, a cylindrical counter-die adapted to support one end of a tubular blank, a cylindrical upsetting ring movable longitudinally in relation to the die and adapted to press against the other end of the blank, a cylindrical mandrel movable longitudinally in the upsetting ring and having the shape of the inner side of the finished ring, and another cylindrical mandrel provided in the counter-die and placed coaxially with the first-named mandrel.

7. Apparatus for producing rings, as for instance track-rings for ball and roller bearings, comprising a die having inside the shape of the outer side of the finished ring, a counter-die adapted to support one end of a tubular blank and movable to a certain extent in relation to said die, a spring supporting said counter-die, and adapted to yield to said movement, an upsetting ring movable longitudinally in relation to the die and adapted to press against the other end of the blank, a mandrel movable longitudinally in the upsetting ring and having the shape of the inner side of the finished ring, a spring counteracting the motion of said mandrel and a second mandrel in the counter-die placed coaxially with the first-named mandrel and coöperating therewith to shape the inner side of the ring.

In testimony whereof I have signed my name.

PATRIK SAMUEL RYDBECK.